US012190784B2

(12) United States Patent
Lee et al.

(10) Patent No.: US 12,190,784 B2
(45) Date of Patent: Jan. 7, 2025

(54) DISPLAY DEVICE FOR REDUCING FLICKER AND ELECTRONIC DEVICE COMPRISING SAME

(71) Applicant: Samsung Electronics Co., Ltd., Suwon-si (KR)

(72) Inventors: Juseok Lee, Suwon-si (KR); Minwoo Lee, Suwon-si (KR); Seoyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/983,049

(22) Filed: Nov. 8, 2022

(65) Prior Publication Data

US 2023/0075226 A1 Mar. 9, 2023

Related U.S. Application Data

(63) Continuation of application No. PCT/KR2021/005170, filed on Apr. 23, 2021.

(51) Int. Cl.
*G09G 3/20* (2006.01)

(52) U.S. Cl.
CPC ....... *G09G 3/2096* (2013.01); *G09G 2310/06* (2013.01); *G09G 2320/0247* (2013.01); *G09G 2320/064* (2013.01)

(58) Field of Classification Search
CPC ............. G09G 3/2096; G09G 2310/06; G09G 2320/064; G09G 2320/024747
See application file for complete search history.

(56) References Cited

U.S. PATENT DOCUMENTS

| | | | |
|---|---|---|---|
| 7,932,884 | B2 | 4/2011 | Song et al. |
| 8,446,395 | B2 | 5/2013 | Song et al. |
| 9,111,494 | B2 | 8/2015 | Choi |
| 9,218,772 | B2 | 12/2015 | Kim |
| 9,318,069 | B2 | 4/2016 | Nambi et al. |
| 9,378,697 | B2 | 6/2016 | Fujioka et al. |

(Continued)

FOREIGN PATENT DOCUMENTS

| | | | |
|---|---|---|---|
| JP | 2015-191097 | A | 11/2015 |
| KR | 10-2008-0093758 | A | 10/2008 |

(Continued)

OTHER PUBLICATIONS

Korean Office Action dated May 21, 2024, issued in Korean Application No. 10-2020-0056023.

*Primary Examiner* — Towfiq Elahi
(74) *Attorney, Agent, or Firm* — Jefferson IP Law, LLP

(57) ABSTRACT

A display device including a display panel and a display driving circuit to control the display panel are provided. The display driving circuit includes a light emitting control driver to input a light emitting signal for controlling the brightness of the display panel into the display panel. When a light emitting control signal including a plurality of pulses is input into the light emitting control driver to control the light emitting signal, and when the operating frequency of the light emitting control signal is changed, pulse widths corresponding to at least two pulses of pulses included in the light emitting control signal may be adjusted to differ from each other in a frame after the target time point to change the operating frequency.

20 Claims, 10 Drawing Sheets

(56) References Cited

U.S. PATENT DOCUMENTS

| | | | | |
|---|---|---|---|---|
| 9,501,993 | B2 | 11/2016 | Nambi et al. | |
| 9,524,694 | B2 | 12/2016 | Wang et al. | |
| 9,570,018 | B2 | 2/2017 | Kim | |
| 9,601,074 | B2 | 3/2017 | Fujioka et al. | |
| 9,711,094 | B2 | 7/2017 | Lee et al. | |
| 10,008,161 | B2 | 6/2018 | Lee et al. | |
| 10,019,968 | B2 | 7/2018 | Bi et al. | |
| 10,043,464 | B2 | 8/2018 | Watanabe et al. | |
| 10,056,050 | B2 | 8/2018 | Nambi et al. | |
| 10,600,379 | B2 | 3/2020 | Nambi et al. | |
| 10,720,114 | B2 | 7/2020 | Choi et al. | |
| 10,810,930 | B2 | 10/2020 | Shim et al. | |
| 2007/0080905 | A1* | 4/2007 | Takahara | G09G 3/3258 345/76 |
| 2013/0321254 | A1* | 12/2013 | Kim | G09G 3/2014 345/102 |
| 2014/0184485 | A1 | 7/2014 | Kim | |
| 2014/0198093 | A1 | 7/2014 | Nambi et al. | |
| 2015/0145900 | A1 | 5/2015 | Lee et al. | |
| 2016/0086557 | A1 | 3/2016 | Watanabe et al. | |
| 2016/0125785 | A1 | 5/2016 | Wang et al. | |
| 2016/0267870 | A1 | 9/2016 | Fujioka et al. | |
| 2017/0047027 | A1 | 2/2017 | Nambi et al. | |
| 2017/0193971 | A1 | 7/2017 | Bi et al. | |
| 2017/0309237 | A1 | 10/2017 | Lee et al. | |
| 2018/0096670 | A1 | 4/2018 | Iwaki et al. | |
| 2018/0151109 | A1* | 5/2018 | Shim | G09G 3/3233 |
| 2019/0057661 | A1 | 2/2019 | Choi et al. | |
| 2019/0139496 | A1* | 5/2019 | Peng | G09G 3/3266 |

FOREIGN PATENT DOCUMENTS

| | | | |
|---|---|---|---|
| KR | 10-2013-0061603 | A | 6/2013 |
| KR | 10-2013-0133519 | A | 12/2013 |
| KR | 10-2014-0084838 | A | 7/2014 |
| KR | 10-2018-0059017 | A | 6/2018 |
| KR | 10-2019-0020265 | A | 2/2019 |

* cited by examiner

DISPLAY DEVICE FOR REDUCING FLICKER AND ELECTRONIC DEVICE COMPRISING SAME

CROSS-REFERENCE TO RELATED APPLICATION(S)

This application is a continuation application, claiming priority under § 365(c), of an International application No. PCT/KR2021/005170, filed on Apr. 23, 2021, which is based on and claims the benefit of a Korean patent application number 10-2020-0056023, filed on May 11, 2020, in the Korean Intellectual Property Office, the disclosure of which is incorporated by reference herein in its entirety.

BACKGROUND

1. Field

The disclosure relates to a display device.

2. Description of Related Art

Recently, various types of electronic devices, such as a smartphone, and a tablet personal computers (PC), have been widely spread with the development of information technology. A user may perform various functions of browsing the Internet, playing a game, and reproducing a moving picture using a display device.

The display device may provide content to a user through light in various colors, and the light in various colors may adjust a brightness, a contrast ratio, or a grayscale in various phases. The display device may output various images or videos by emitting light from pixels included in the display device. Meanwhile, the display device may include a display panel (hereinafter, simply referred to as a "panel") for displaying an image screen, and a display driver integrated circuit (DDI). The DDI may drive the panel by receiving image data from the outside, performing image processing on the received image data, and applying an image signal to the panel based on the image data subject to image processing.

The above information is presented as background information only to assist with an understanding of the disclosure. No determination has been made, and no assertion is made, as to whether any of the above might be applicable as prior art with regard to the disclosure.

SUMMARY

The display device may drive a panel using a pulse width modulation scheme to improve image quality with a low grayscale. However, when an operating frequency of the pulse width modulation signal is changed (or a refresh rate is changed), a phenomenon in which a screen flickers, may occur.

Aspects of the disclosure are to address at least the above-mentioned problems and/or disadvantages and to provide at least the advantages described below. Accordingly, an aspect of the disclosure is to provide a display device capable of controlling the brightness of a screen by using a pulse width modulation signal.

Another aspect of the disclosure is to provide a display device capable of controlling a duty ratio of a pulse width modulation signal when changing an operating frequency, to reduce or prevent a phenomenon in which a screen flickers when changing the operating frequency of the pulse width signal (or changing the refresh rate) of the pulse width signal, and an electronic device including the same.

Additional aspects will be set forth in part in the description which follows and, in part, will be apparent from the description, or may be learned by practice of the presented embodiments.

In accordance with an aspect of the disclosure, a display device is provided. The display device includes a display panel and a display driving circuit to control the display panel. The display driving circuit may include a light emitting control driver to input a light emitting signal for controlling a brightness of the display panel into the display panel, input a light emitting control signal including a plurality of pulses to the light emitting control driver, to control the light emitting signal, and adjust pulse widths, which correspond to at least two pulses of the pulses included in the light emitting control signal, to differ from each other, in a frame right after a target point to change an operating frequency, when the operating frequency of the light emitting control signal is changed.

In accordance with another aspect of the disclosure, a display device is provided. The display device includes a display panel and a display driving circuit to control the display panel. The display driving circuit may include a light emitting control driver to input a light emitting signal for controlling a brightness of the display panel into the display panel, input a light emitting control signal including a plurality of pulses to the light emitting control driver, to control the light emitting signal, and adjust pulse widths, which correspond to at least two pulses of pulses included in the light emitting control signal in the second frame, to differ from each other, or insert a third frame between a first frame and a second frame, which are subsequent to each other, and adjust the pulse widths, which correspond to at least two pulses of the pulses included in the light emitting control signal in the third frame, to differ from each other, when an operating frequency is changed between the first frame and the second frame subsequent to each other, and when a duty-ratio difference between a duty ratio of one pulse, which is included in the first frame, and one pulse included in the second frame, and a specific duty ratio is equal to or greater than a reference value.

In accordance with another aspect of the disclosure, a display device is provided. The display device includes a display panel, and a display driving circuit to control the display panel. The display driving circuit may include a light emitting control driver to input a light emitting signal for controlling a brightness of the display panel into the display panel, input a light emitting control signal including a plurality of pulses to the light emitting control driver, to control the light emitting signal, and insert a third frame between a first frame and a second frame, which are subsequent to each other, and adjust pulse widths, which correspond to at least two pulses of pulses included in the light emitting control signal in the third frame, to differ from each other, when an operating frequency is changed between the first frame and the second frame subsequent to each other, and when a duty-ratio difference between a duty ratio of one pulse included in the first frame and one pulse included in the second frame, and a specific duty ratio is equal to or greater than a first reference value.

According to embodiments of the disclosure, the display device to control the brightness of the screen by using the pulse width modulation signal may reduce or prevent the flicker phenomenon, when the operating frequency of the pulse width modulation signal is changed (or the refresh rate is changed).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
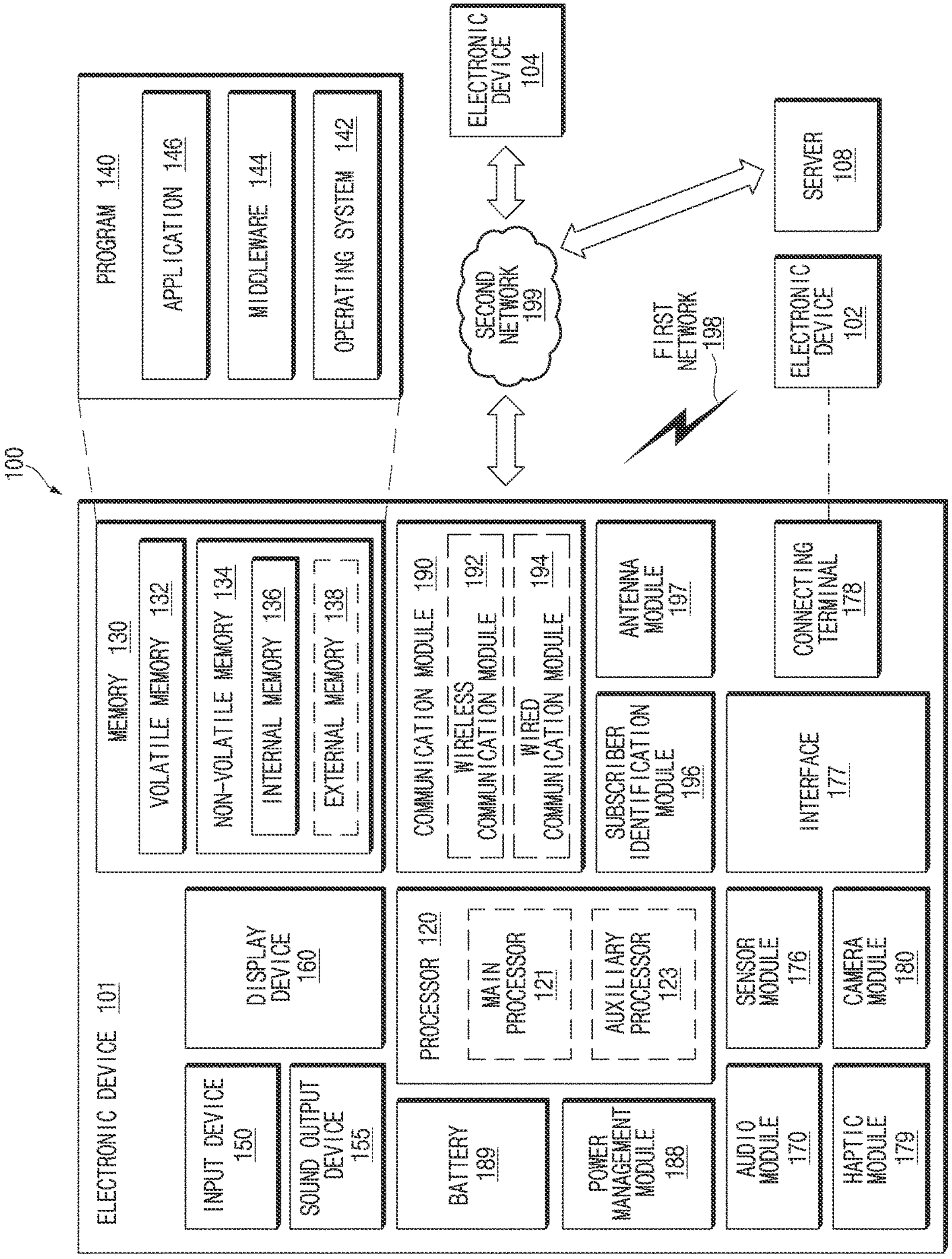
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In other embodiments, some of the components may be implemented as single integrated circuitry. For example, the sensor module 176 (e.g., a fingerprint sensor, an iris sensor, an illuminance sensor, and the like) may be implemented as embedded in the display device 160 (e.g., a display).

The processor 120 may be configured to execute, for example, software (e.g., a program 140) to control at least one other component (e.g., a hardware or software component) of the electronic device 101 coupled with the processor 120, and may perform various data processing or computation. In an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123.

The memory 130 may be configured to store various data used by at least one component (e.g., the processor 120 or the sensor module 176) of the electronic device 101. The various data may include, for example, software (e.g., the program 140) and input data or output data for a command related thereto. In an embodiment, the memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. In another embodiment, the input device 150 may include, for example, a microphone, a mouse, a keyboard, or a digital pen (e.g., a stylus pen).

The sound output device 155 may output sound signals to the outside of the electronic device 101. In still another embodiment, the sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. In an embodiment, the display device 160 may include, for example, a display, a hologram device, or a projector and control circuitry to control a corresponding one of the display, hologram device, and projector. According to another embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, an audio interface, and the like.

A connecting terminal 178 may include a connector via which the electronic device 101 may be physically connected with the external electronic device (e.g., the electronic device 102). According to another embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to another embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. According to another embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to another embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to still another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to another embodiment, all or some of operations to be executed at the electronic device 101 may be executed at one or more of the external electronic devices 102, 104, or 108. If the electronic device 101 should perform a function or a service automatically, or in response to a request from a user or another device, the electronic device 101, instead of, or in addition to, executing the function or the service, may request the one or more external electronic devices to perform at least part of the function or the service. According to yet another embodiment, the one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
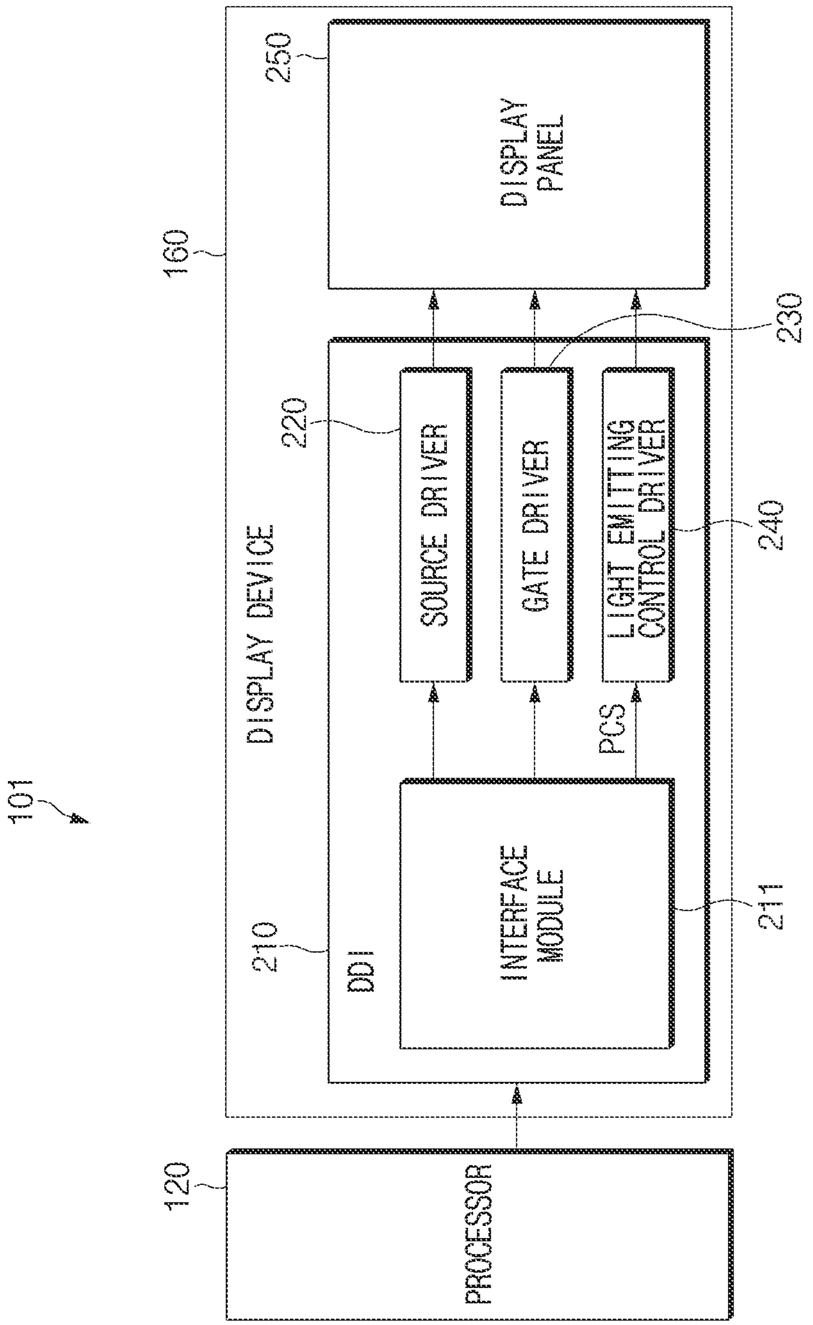
FIG. 2 is a block diagram illustrating a display device included in an electronic device, according to an embodiment of the disclosure.

FIG. 2 is a block diagram illustrating a display device included in an electronic device, according to an embodiment of the disclosure.

Referring to FIG. 2, an electronic device 101 may include a processor 120 (e.g., an application processor) and a display device 160. The display device 160 may include a display driving circuit 210 and a display panel 250. In an embodiment, the display driving circuit 210 may include an interface module 211, a source driver 220, a gate driver 230, and a light emitting control driver 240.

According to another embodiment, the processor 120 may transmit image data (e.g., image data or still image data) to be displayed, to the display driving circuit 210. The image data may be divided in a line data unit corresponding to a horizontal line (or a vertical line) of the display panel 250.

According to still another embodiment, the interface module 211 may receive the image data, and may control the source driver 220, the gate driver 230, and the light emitting control driver 240, based on the image data. The interface module 211 may generate a source control signal for controlling the source driver 220, based on the image data. The interface module 211 may generate a gate control signal for controlling the gate driver 230, based on the image data. In an embodiment, the interface module 211 may generate a light emitting control signal PCS for controlling the light emitting control driver 240, based on the image data.

According to another embodiment, the source driver 220 may generate output data supplied to the display panel 250, in response to the source control signal. The gate driver 230 may generate a gate signal supplied to the display panel 250, in response to the gate control signal. In yet another embodiment, the light emitting control driver 240 may generate a light emitting signal supplied to the display panel 250, in response to the light emitting control signal PCS.

According to an embodiment, the display panel 250 may display the output data, through the source driver 220, the gate driver 230, and the light emitting control driver 240. The display panel 250 may be implemented with a light emitting diode (LED) display panel, an organic LED (OLED) display panel, an active matrix OLED (AMOLED) display panel, or a flexible display panel. For example, the display panel 250 may have the form of a matrix in which gate lines cross source lines. Gate signals may be supplied to the gate lines. Signals corresponding to the output data may be supplied to the source lines. A signal corresponding to the output data may be supplied to the source driver 220, under the control of a timing controller inside the display driving circuit 210.

According to another embodiment, the brightness of the display panel 250 may be controlled by the light emitting control driver 240. The light emitting control driver 240 may supply a light emitting signal to each pixel of the display panel 250. For example, the light emitting control signal PCS may be implemented with a pulse width modulation signal. In yet another embodiment, the light emitting control signal PCS may include a pulse signal having a specific cycle (e.g., four cycles) within one frame, and the pulse signal may be implemented to have a specific duty ratio (e.g., 50%).

Figure 3:
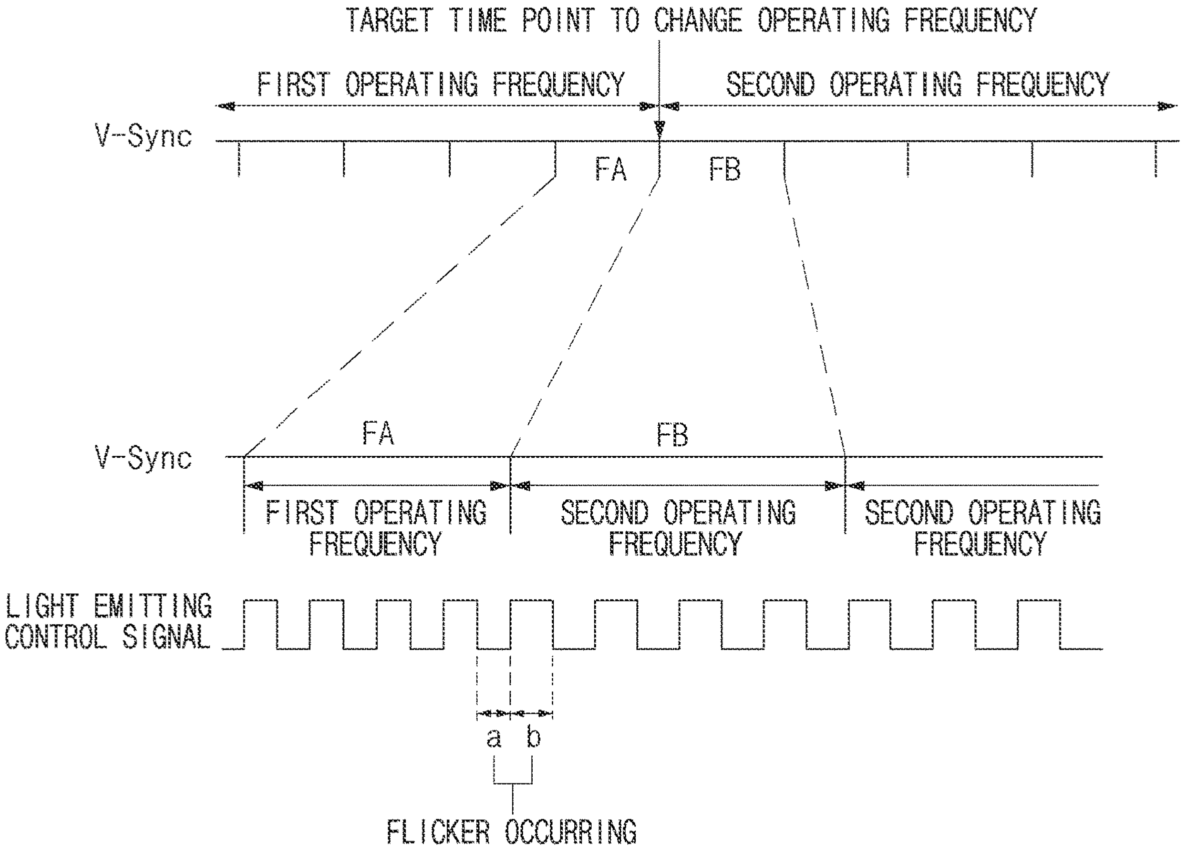
FIG. 3 is a view illustrating a light emitting control signal of a display device when an operating frequency is changed, according to an embodiment of the disclosure.

FIG. 3 is a view illustrating a light emitting control signal of a display device, when an operating frequency is changed according to an embodiment of the disclosure.

Referring to FIGS. 2 and 3, a vertical synchronization (sync) signal V-Sync may synchronize outputs of a display panel 250 from an uppermost gate line to a lowermost gate line. Image data in one frame, for example, may be output to the display panel 250 in every cycle of a vertical sync signal V-Sync.

According to an embodiment, the light emitting control signal PCS may include a pulse signal, which has a specific cycle, in one frame. The light emitting control signal PCS may be implemented with the pulse width modulation signal. The light emitting control signal PCS may be set to have the specific duty ratio (e.g., 50%) in one frame. Each pixel of the display panel 250 may periodically perform a light emitting operation or a non-light emitting operation, in response to the light emitting control signal PCS.

According to another embodiment, the display driving circuit 210 may change the operating frequency (or a refresh rate) of the display panel 250 due to various causes (e.g., power reduced, and content changed). The display driving circuit 210 may set an operating frequency change target. In yet another embodiment, the display driving circuit 210 may input a light emitting control signal PCS having a first operating frequency (e.g., 60 Hz) to the light emitting control driver 240, before a target time point to change the operating frequency. The display driving circuit 210 may input the light emitting control signal PCS having a second operating frequency (e.g., 45 Hz) to the light emitting control driver 240, after the target time point to change the operating frequency. For example, in a frame FA right before the target time point to change the operating frequency, the light emitting control signal PCS may be generated at the first operating frequency (e.g., 60 Hz), and the refresh rate of the frame FA may be a first time (e.g., 16.7 ms). In another example, in a frame FB right after the target time point to change the operating frequency, the light emitting control signal PCS may be generated at the second operating frequency (e.g., 45 Hz), and the refresh rate of the frame FB may be a second time (e.g., 22.2 ms).

According to an embodiment, at the target time point to change the operating frequency, the pulse width of the light emitting control signal PCS may be changed. For example, the pulse width of the light emitting control signal PCS in the frame FA may be "a" (e.g., 2.1 ms), and the pulse width of the light emitting control signal PCS in the frame FB may be "b" (e.g., 2.8 ms). The duty ratio (or the ratio between "a" to "b"; the duty ratio of pulses=the length of a high-level pulse/(the length of a low-level pulse+the length of the high-level pulse; (b/(a+b))*100=2.8/(2.1+2.8)*100=57.1%)) of pulses right before and after the target time point to change the operating frequency may be changed to be different from the duty ratio in the frame FA. In each frame, the duty ratio of the light emitting control signal PCS may be set to a specified ratio (e.g., 50%). When the duty-ratio difference between the duty ratio of pulses right before and after the target time point to change the operating frequency, and the duty ratio in each frame is equal to or greater than a reference value (e.g., 5%), a flicker phenomenon may be viewed by a user on the display panel 250. A method for controlling the display device 160 to reduce (or prevent) the flicker phenomenon will be described below with reference to FIGS. 4A, 4B, and 5 to 9.

Figure 4A:
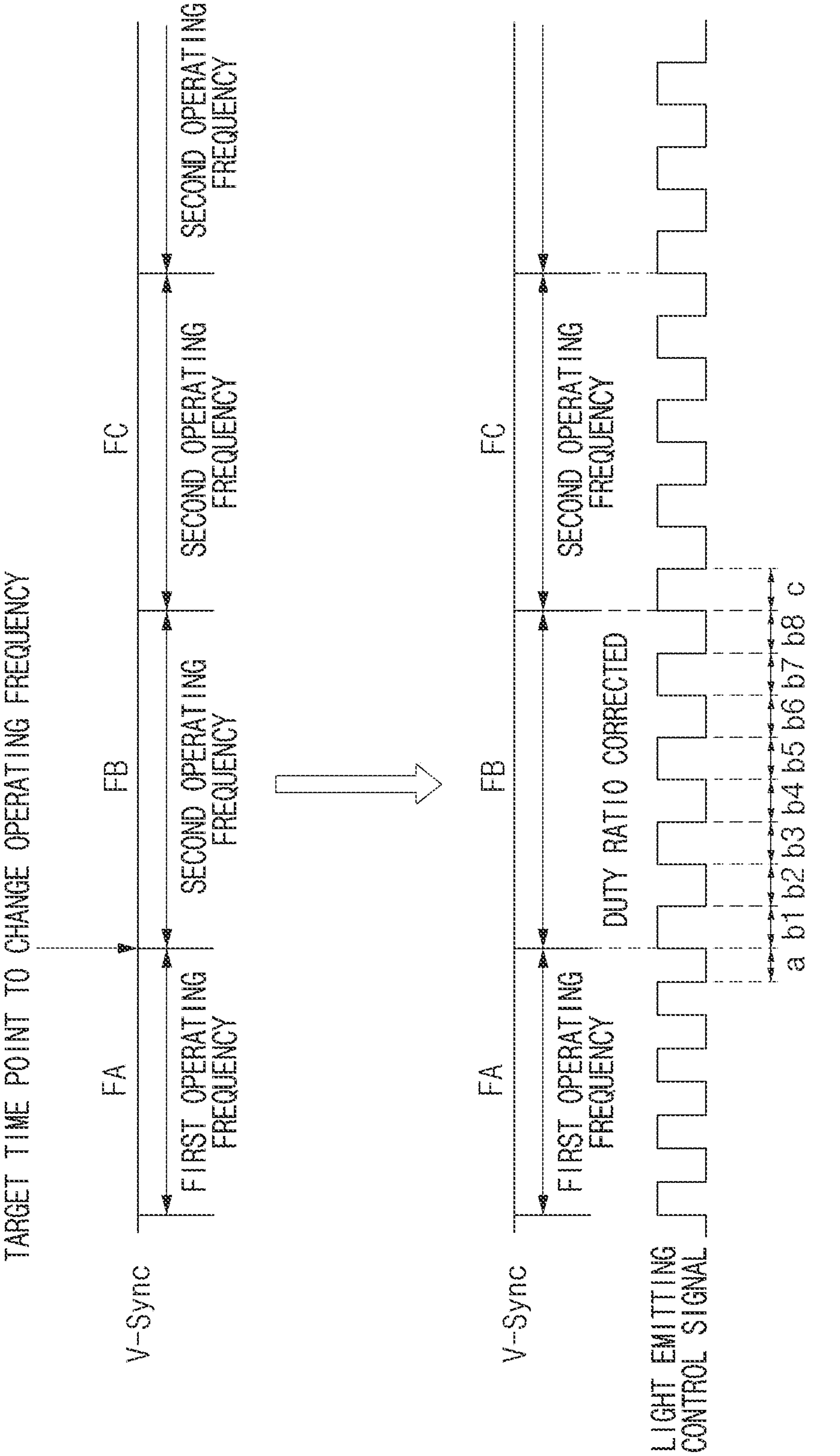
FIG. 4A is a view illustrating a method for operating a display device when an operating frequency is changed, according to an embodiment of the disclosure.

FIG. 4A is a view illustrating a method for operating a display device, when changing an operating frequency, according to an embodiment of the disclosure.

Figure 4B:
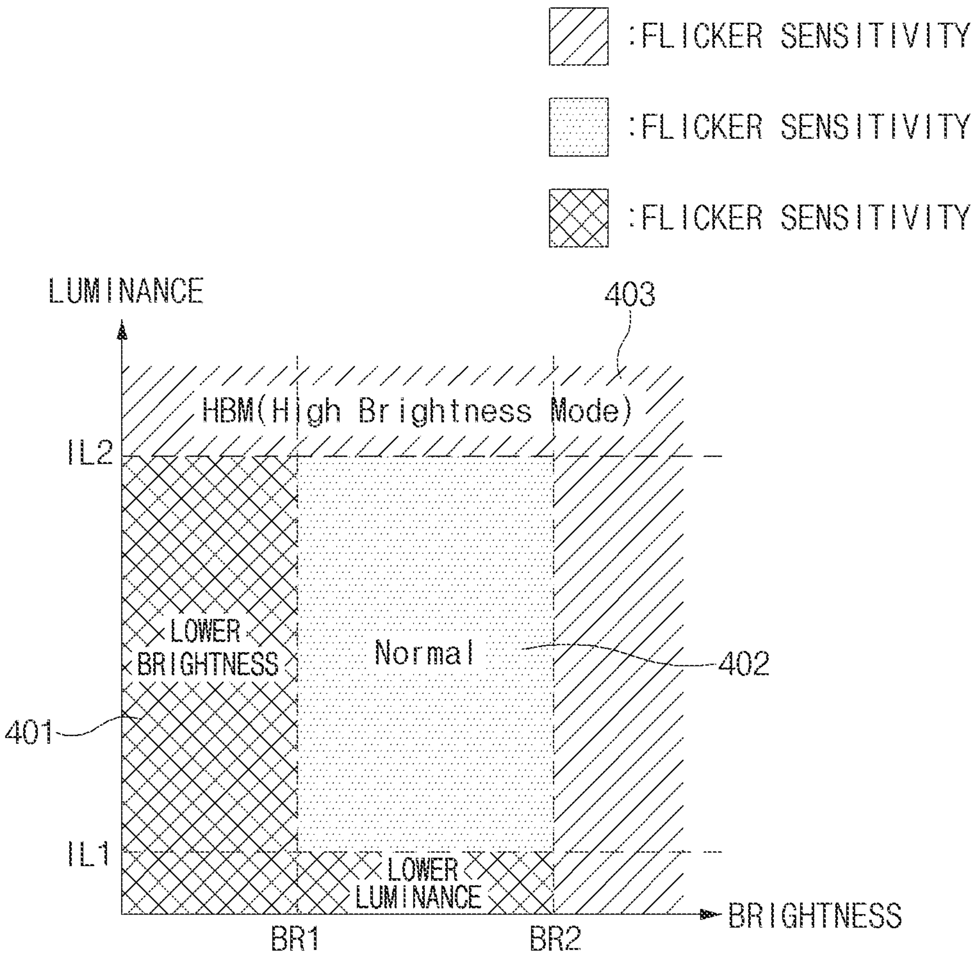
FIG. 4B is a graph illustrating flicker sensitivity under a specific condition of a display device, according to an embodiment of the disclosure.

FIG. 4B is a graph illustrating flicker sensitivity under a specific condition of a display device, according to an embodiment of the disclosure.

Referring to FIGS. 2 and 4A, a frequency of a light emitting control signal PCS may be changed from a first operating frequency (e.g., 60 Hz) to a second operating frequency (e.g., 45 Hz) at a target time point to change an operating frequency. For example, in the frame FA, the light emitting control signal PCS may have the first operating frequency. In the frame FB and the frame FC, the light emitting control signal PCS may have the second operating frequency. In an embodiment, the light emitting control signal PCS may include pulse signals having a specific cycle (e.g., four cycles) in each frame. According to another embodiment, when the operating frequency is changed and when the duty-ratio difference of the light emitting control signal PCS is less than a first reference value (e.g., 10%) and greater than or equal to the second reference value (e.g., 5%), a flicker phenomenon may occur on the display panel 250. The duty-ratio difference may refer to the difference between the duty ratio due to adjacent pulses (e.g., a high-level pulse and a low-level pulse) of the light emitting control signal PCS, and the specific duty ratio (e.g., 50%). Alternatively, the duty-ratio difference may refer to a difference (e.g., the difference between a first duty ratio and a second duty ratio with respect to the first duty ratio based "a" and "b1", and the second duty ratio between "b1" and "b2") calculated based on adjacent pulses of the light emitting control signal PCS.

According to still another embodiment, before correcting the duty ratio in the frame FB, the light emitting control signal PCS may be set to have the second operating frequency and the specific duty ratio (e.g., 50%). The light emitting control signal PCS includes pulse signals having the same cycle in each frame. When the specific duty ratio is maintained in each frame, the duty ratio may be changed in pulses (e.g., "a" and "b" in FIG. 3) before and after the target time point to change the operating frequency. When the duty ratio of the light emitting control signal PCS is changed at the target time point to change the operating frequency, a flicker phenomenon may occur.

According to an embodiment, when the operating frequency is changed and when the duty-ratio difference of the light emitting control signal PCS is less than a first reference value (e.g., 10%) and greater than or equal to the second reference value (e.g., 5%), a flicker phenomenon may occur on the display panel 210. For example, in the frame FB, the display driving circuit 210 may adjust the width of at least one pulse of the light emitting control signal PCS, such that the duty-ratio difference between the pulses included in the light emitting control signal PCS is smaller than the second reference value.

According to another embodiment, "a", "b1" to "b8", and "c" in FIG. 4A may refer to the lengths (or time) of the relevant pulses (e.g., a high-level pulse or a low-level pulse). The display driving circuit 210 may set (or adjust) "b1" such that the duty-ratio difference between the duty ratio between "a" and "b1" and the specific duty ratio is less than the second reference value (e.g., 5%). For example, "b1" may be determined by Equation 1.

$$Q = \frac{TH * P}{1 - TH} \qquad \text{Equation 1}$$

In Equation 1, "P" may represent the length of a previous pulse, "Q" may represent the length of the pulse to be changed, and "TH" may represent a constant for the target duty-ratio difference. For example, in a situation in which the second operating frequency (e.g., 45 Hz) is lower than the first operating frequency (e.g., 60 Hz), "TH" (when the target duty-ratio difference is 5%, "TH" is set to 0.55, and when the target duty-ratio difference is 10%, "TH" is 0.60) may be set to be greater than the reference constant (e.g., 0.5). Alternatively, when the second operating frequency (e.g., 60 Hz) is greater than the first operating frequency (e.g., 45 Hz), "TH" (when the target duty-ratio difference is 5%, "TH" may be set to 0.45, when the target duty-ratio difference is 10%, "TH" may be set to 0.40) may be set to be less than the reference constant (e.g., 0.5).

For example, in a situation in which the first operating frequency is 60 Hz, the length of the frame FA may be 16.7 ms. In this case, "a" may be 2.08 ms (e.g., 16.7/8). Based on Equation 1, "b1" may be calculated as 2.55 ms (e.g., b1=(0.55*a)/(1−0.55)=0.55*2.08/0.45=2.55). The display driving circuit 210 may set "b2" to be equal to "b1". When the second operating frequency is 45 HZ, the length of the frame FB may be 22.2 ms. The display driving circuit 210 may allocate the half of the frame FB to the high-level pulses (e.g., "b1", "b3", "b5", "b7"). In the frame FB, the display driving circuit 210 may set the lengths (e.g., "b1", "b3", "b5", "b7") of the high-level pulses to be equal to each other.

In addition, in the frame FB, the display driving circuit 210 may set the length of the high-level pulse to be equal to the length of the low-level pulse (e.g., "b3" and "b4", "b5" and "b6", and "b7" and "b8"). Accordingly, "b3", "b5", and "b7" may be set 2.85 ms (e.g., b3=b5=b7=(11.1−b1)/3=(11.1−2.55)/3=2.85). The duty ratio (e.g., 2.85*100/(2.55+2.85)=52.8) between "b2" (e.g., 2.5 ms) and "b3" (e.g., 2.85 ms) is 52.8%. Accordingly, the duty-ratio difference of 5% or less (e.g., the second reference value) may be satisfied in the frame FB.

For another example, the display driving circuit 210 may determine b1 based on Equation 1, and may set "b2" to "b8" to be equal to "c", when the duty-ratio difference between "b1" and "c" and the specific duty ratio is less than the second reference value. For another example, after determining "b1", the display driving circuit 210 may set (or adjust) "b2", such that the duty-ratio difference between the duty ratio between "b1" and "b2" and the specific duty ratio, when the duty-ratio difference between "b1" and "c" and the specific duty ratio is equal to or greater than the second reference value. When the duty-ratio difference between the duty-ratio based on "b2" and "c" and the specific duty ratio is less than the second reference value, the display driving circuit 210 may set "b3" to "b8" to be equal to "c". In a similar manner, the display driving circuit 210 may set "b3" to "b8" to be different from each other or equal to each other. For example, when the second operating frequency (e.g., 45 Hz) is lower than the first operating frequency (e.g., 60 Hz), the display driving circuit 210 may set "b1" to "b8" such that "b1" to "b8" are sequentially increased between "a" and "c". For example, when the second operating frequency (e.g., 60 Hz) is greater than the first operating frequency (e.g., 45 Hz), the display driving circuit 210 may set "b1" to "b8" such that "b1" to "b8" are sequentially decreased between "a" and "c". Alternatively, the display driving circuit 210 may change at least two values of "b1" to "b8" and set the remaining values to be equal to "c". Pulses corresponding to at least two values, which are different from "c", among "b1" to "b8", may not be adjacent to each other. Pulses corresponding to at least two values, which are different from "c", among "b1" to "b8", may not be consecutively provided. At least one pulse, which has the pulse width equal to "c", may be disposed between pulses having mutually different two values among "b1" to "b8". The difference between the duty ratio of the adjacent pulses of the light emitting control signal PCS and the specific duty ratio may be set to be less than the second reference value, between the frame FA and the frame FB, and between the frame FB and the frame FC, and the flicker phenomenon may be reduced (or prevented) when the operating frequency is changed.

According to still another embodiment, the display driving circuit 210 may determine (or change) a reference value (e.g., the first reference value or the second reference value) regarding a duty-ratio difference based on a specific condition (e.g., brightness and illumination). In the graph of FIG. 4B, the sensitivity of the flicker phenomenon (hereinafter, referred to as flicker sensitivity) may be classified depending on a first region 401, a second region 402, or a third region 403. The first region 401, the second region 402, or the third region 403 may be classified based on a first brightness value BR1, a second brightness value BR2, a first illuminance value IL1, or a second illuminance value IL2. The flicker sensitivity may be increased in the first region 401. The first region 401 may include a low brightness state or a low illuminance state. The first region 401 may include a portion having a brightness less than the first brightness value BR1 and having an illuminance less than the second illuminance value IL2, or a portion having a brightness less than the second brightness value BR2 and having an illuminance less than the first illuminance value IL1 The flicker sensitivity may be increased in the third region 403. The third region 403 may include a higher brightness state or a lower illuminance state. The third region 403 may include a portion having a brightness greater than the second brightness value BR2 or an illuminance greater than the second illuminance value IL2. The third region 403 may include a high brightness mode (HBM) region. The flicker sensitivity in the second region 402 is lower than the flicker sensitivity in the first region 401, and higher than the flicker sensitivity in the third region 403. The second region 402 may include a portion having a brightness between the first brightness value BR1 and the second brightness value BR2 and an illuminance between the first illuminance value IL1 and the second illuminance value IL2. For example, the first brightness value BR1 and the first illuminance value IL1 may be experimentally determined, based on whether flicker occurs. As another example, the second brightness value BR2 may be determined as a maximum brightness value of the display device 160. For example, the second illuminance value IL2 may be determined depending on a condition of entering into the high brightness mode (HBM).

According to an embodiment, the display driving circuit 210 may set various reference values for the above duty-ratio difference (e.g., the first reference value or the second reference value) depending on the state (e.g., the first region 401, the second region 402, or the third region 403 of FIG. 4B) of brightness (e.g., the brightness of the display device 160) or illuminance (e.g., the ambient illuminance of the electronic device 101). The display driving circuit 210 may set the highest reference value (e.g., the first reference value is set to 11%, and the second reference value is set to 6%) for the above duty-ratio difference in the third region 403, which has the lowest flicker sensitivity, among the first region 401 to the third region 403 or may not set the reference value for the duty-ratio in the third region 403 (e.g., a method for correcting the duty ratio of FIG. 4A is not performed). For example, the display driving circuit 210 may set the lowest reference value (e.g., the first reference value is set to 9%, and the second reference value is set to 4%) for the above duty-ratio difference in the first region 401, which has the highest flicker sensitivity, among the first region 401 to the third region 403. In another embodiment, the display driving circuit 210 may set the intermediate reference value, which is between the reference value for the first region 401 and the reference value for the third region 403, for the duty-ratio difference in the second region 402, which has the intermediate flicker sensitivity, among the first region 401 to the third region 403 (e.g., the first reference value is set to 10%, and the second reference value is set 5%). Accordingly, the display driving circuit 210 may adaptively perform the method for correcting the duty ratio of FIG. 4A depending on the state or the environment of the electronic device 101. A method for changing a reference value for the duty-ratio difference resulting from the flicker sensitivity may be applied to the method made with reference to FIGS. 5 to 9 to be described below.

According to various embodiments (not illustrated), the display driving circuit 210 may set various reference values (e.g., the first reference value or the second reference value) for duty-ratio difference depending on the relationship between the first operating frequency of the frame FA and the second operating frequency of the frame FB. For example, when the second operating frequency is higher than the first operating frequency, the display driving circuit 210 may set a reference value for the duty-ratio difference to a less value (e.g., the first reference value is set to 9% and the second reference value is set to 4%). For example, when the second operating frequency is lower than the first operating frequency, the display driving circuit 210 may set a reference value for the duty-ratio difference to a greater value (e.g., the first reference value is set to 11% and the second reference value is set to 6%). A method for changing the reference value with respect to the duty-ratio difference depending on the relationship between the first operating frequency and the second operating frequency may be applied to the method made with reference to FIGS. 5 to 9 described below.

Figure 5:
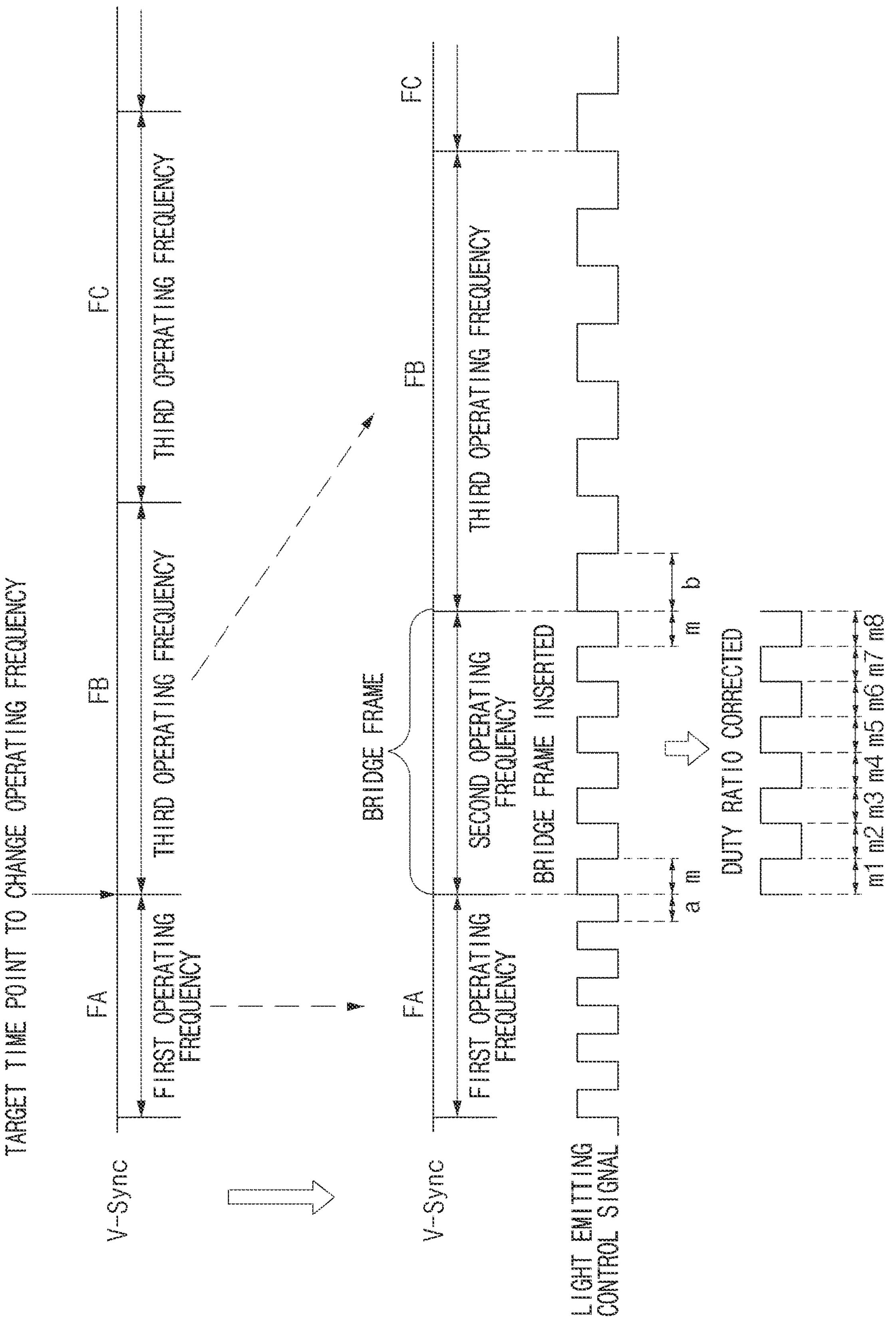
FIG. 5 is a view illustrating another example of a method for operating a display device, when an operating frequency is changed, according to an embodiment of the disclosure.

FIG. 5 is a view illustrating a method for operating a display device, when changing an operating frequency, according to an embodiment of the disclosure.

Referring to FIGS. 2 and 5, a frequency of a light emitting control signal PCS may be changed from a first operating frequency (e.g., 60 Hz) to a third operating frequency (e.g., 30 Hz) at a target time point to change an operating frequency. In the frame FA, the light emitting control signal PCS may have the first operating frequency. In the frame FB and the frame FC, the light emitting control signal PCS may have the third operating frequency. In an embodiment, the light emitting control signal PCS may include pulse signals having a specific cycle (e.g., four cycles) in each frame. According to an embodiment, when the operating frequency is changed and when the duty-ratio difference of the light emitting control signal PCS is greater than the first reference value (e.g., 10%), the flicker phenomenon may occur in the display panel 250. The duty-ratio difference is equal to or greater than a specific value (or the degree beyond the range for the method for correcting the duty ratio of FIG. 4A). The flicker phenomenon may not be solved through the method for correcting the duty ratio as illustrated in FIG. 4A). The duty-ratio difference may refer to the difference between the duty ratio of adjacent pulses (e.g., a high-level pulse and a low-level pulse) of the light emitting control signal PCS, and the specific duty ratio (e.g., 50%). Alternatively, the duty-ratio difference may refer to a difference between duty ratios calculated based on adjacent pulses of the light emitting control signal PCS.

Referring to FIG. 5, the display driving circuit 210 may insert a bridge frame BF between the frame FA and the frame FB. For example, in the bridge frame BF, the light emitting control signal PCS may have the second operating frequency (e.g., 45 Hz) between the first operating frequency and the third operating frequency. For example, the length (or time) of one pulse of the light emitting control signal PCS in the frame FA may be “a” (e.g., 2.1 ms), the length (or time) of one pulse of the light emitting control signal PCS in the frame FB may be “b” (e.g., 4.2 ms), and the length (or time) of one pulse of the light emitting control signal PCS in the bridge frame BF may be 2.8 ms. According to various embodiments, the display driving circuit 210 may employ the method for correcting the duty ratio as illustrated in FIG. 4A, with respect to the bridge frame BF. The display driving circuit 210 may set the length (or time) of each of pulses of the light emitting control signal PCS to a value ranging from “m1” to “m8” in the bridge frame BF. The display driving circuit 210 may set “m1” to “m8” to sequentially increase from “m1” to “m8”, between “a” and “b”. Alternatively, the display driving circuit 210 may change at least two values of “m1” to “m8” and set the remaining values to be equal to “b”. The pulses corresponding to at least two values, which are different from “b”, among “m1” to “m8” may not adjacent to each other. The difference between the duty ratio of the adjacent pulses of the light emitting control signal PCS and the specific duty ratio may be set to be less than the second reference value, between the frame FA and the bridge frame BF, and between the bridge frame BF and the frame FB, and the flicker phenomenon may be reduced (or prevented) when the operating frequency is changed.

Figure 6:
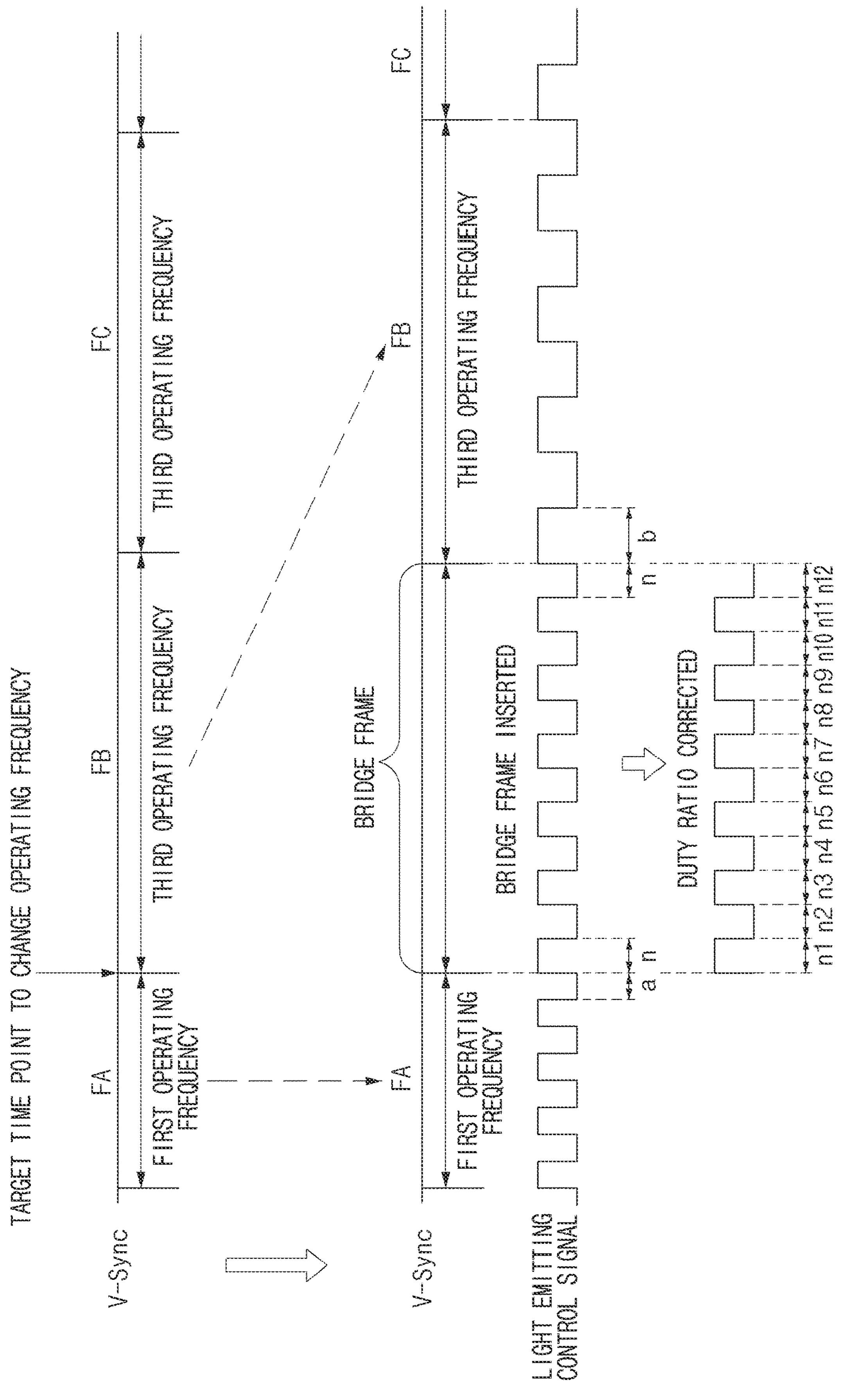
FIG. 6 is a view illustrating another example of a method for operating a display device, when an operating frequency is changed, according to an embodiment of the disclosure.

FIG. 6 is a view illustrating a method for operating a display device, when an operating frequency is changed, according to an embodiment of the disclosure.

Referring to FIGS. 2 and 6, a frequency of a light emitting control signal PCS may be changed from a first operating frequency (e.g., 60 Hz) to a third operating frequency (e.g., 30 Hz) at a target time point to change an operating frequency. For example, in the frame FA, the light emitting control signal PCS may have the first operating frequency. In the frame FB and the frame FC, the light emitting control signal PCS may have the third operating frequency. The light emitting control signal PCS may include pulse signals having a specific cycle (e.g., four cycles) in each frame. According to an embodiment, when the operating frequency is changed and when the duty-ratio difference of the light emitting control signal PCS is greater than the first reference value (e.g., 10%), the flicker phenomenon may occur in the display panel 250. The flicker phenomenon may not be solved through the method for correcting the duty ratio as illustrated in FIG. 4A, because the duty-ratio difference is significantly great. The duty-ratio difference may refer to the difference between the duty ratio of adjacent pulses (e.g., a high-level pulse and a low-level pulse) of the light emitting control signal PCS, and the specific duty ratio (e.g., 50%). In addition, the duty-ratio difference may refer to the difference between the duty ratios calculated based on adjacent pulses of the light emitting control signal PCS.

Referring to FIG. 6, the display driving circuit 210 may insert a bridge frame BF between the frame FA and the frame FB. For example, in the bridge frame BF, the light emitting control signal PCS may include a pulse signal having different frames (e.g., four cycles) and different pulse cycles (e.g., six cycles). Alternatively, the light emitting control signal PCS may include a pulse signal having pulse cycles (e.g., six cycles) later than pulse cycles (e.g., four cycles) in other frames. The length (or time) of the bridge frame BF may be set to be equal to or similar to the length (or time) of the frame FB. For example, the length (or time) of one pulse of the light emitting control signal PCS in the frame FA may be “a” (e.g., 2.1 ms), the length (or time) of one pulse of the light emitting control signal PCS in the frame FB may be “b” (e.g., 4.2 ms), and the length (or time) of one pulse of the light emitting control signal PCS in the bridge frame BF may be 2.8 ms. According to various embodiments, the display driving circuit 210 may employ a method for correcting the duty ratio of FIG. 4A, in the bridge frame BF. The display driving circuit 210 may set a length (or time) of pulses of the light emitting control signal PCS to a value ranging from “n1” to “n12” in the bridge frame BF. The display driving circuit 210 may set “n1” to “n12” to sequentially increase from “n1” to “n12” between “a” and “b”. Alternatively, the display driving circuit 210 may change at least two values of “n1” to “n12” and set the remaining values to be equal to “b”. The pulses corresponding to at least two values, which are different from “b”, among “n1” to “n12” may not adjacent to each other. The difference between the duty ratio of the adjacent pulses of the light emitting control signal PCS and the specific duty ratio may be set to be less than the second reference value, between the frame FA and the bridge frame BF, and between the bridge frame BF and the frame FB, and the flicker phenomenon may be reduced (or prevented) when the operating frequency is changed.

Figure 7:
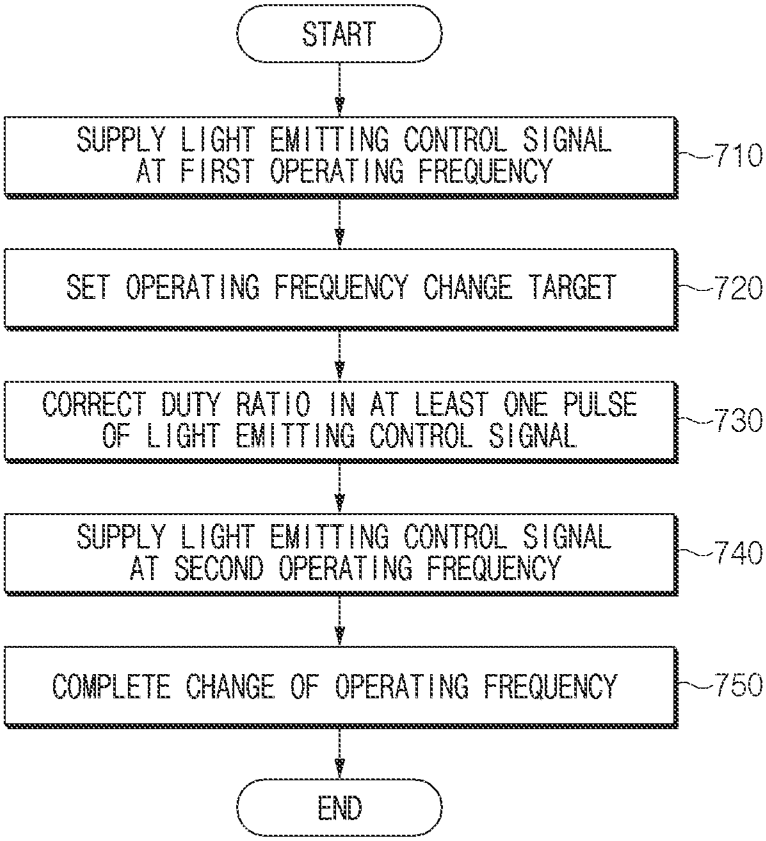
FIG. 7 is a flowchart illustrating a method for operating a display device, when an operating frequency is changed, according to an embodiment of the disclosure.

FIG. 7 is a flowchart illustrating a method for operating a display device, when changing an operating frequency, according to an embodiment of the disclosure.

Referring to FIGS. 2, 4A, and 7, a display driving circuit 210 may reduce (or prevent) a flicker phenomenon of a display panel 250 through a method for correcting a duty ratio as illustrated in FIG. 4A.

According to an embodiment, in operation 710, the display driving circuit 210 may supply the light emitting control signal PCS to the light emitting control driver 240 at the first operating frequency (e.g., 60 Hz). In operation 720, the display driving circuit 210 may set the operating frequency change target (or refresh rate). The display driving circuit 210 may receive a signal related to the change of the operating frequency, from the processor 120.

According to another embodiment, in operation 730, the display driving circuit 210 may correct a duty ratio in at least one pulse of the light emitting control signal PCS at the target time point to change the operating frequency. The display driving circuit 210 may set (or adjust) the length (or time) of pulses, which are included in the light emitting control signal PCS, in the frame (e.g., the frame (FB)) right after the target time point to change the operating frequency, through the method for correcting the duty ratio as illustrated in FIG. 4A. According to various embodiments, the display driving circuit 210 may perform the method for correcting the duty ratio as illustrated in FIG. 4A, in a plurality of frames after the target time point to change the operating frequency.

According to yet another embodiment, in operation 740, the display driving circuit 210 may supply the light emitting control signal PCS to the light emitting control driver 240, at the first operating frequency (e.g., 45 Hz) and the specific duty ratio (e.g., 50%) from the frame (e.g., the frame FC) next to the frame (e.g., the frame FB) applied with the method for correcting the duty ratio as illustrated in FIG. 4A. In operation 750, the display driving circuit 210 may complete an operation of changing the operating frequency and may control the display panel 250 based on the changed operating frequency (e.g., the second operating frequency).

Figure 8:
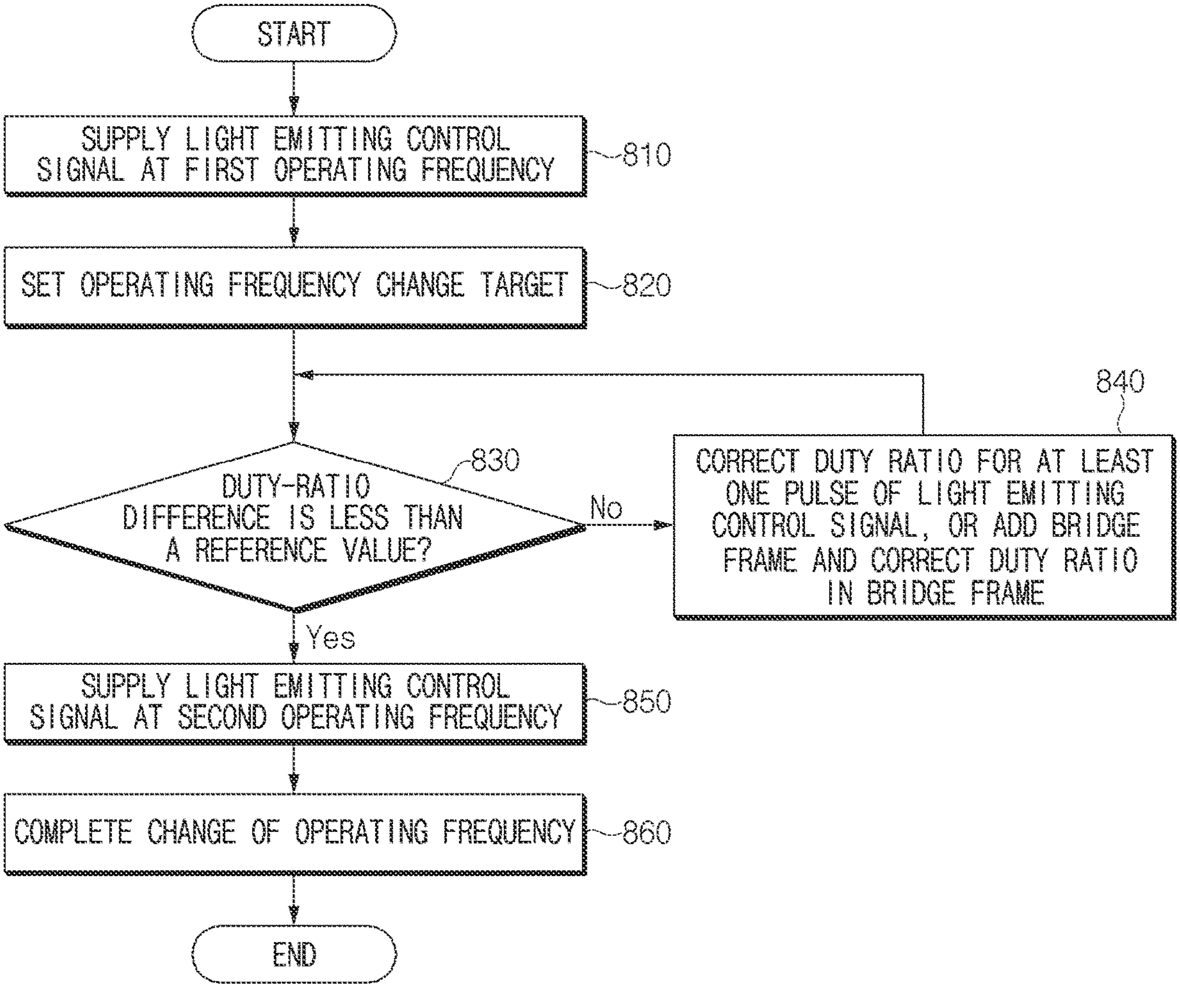
FIG. 8 is a flowchart illustrating a method for operating a display device, when changing an operating frequency, according to an embodiment of the disclosure.

FIG. 8 is a flowchart illustrating a method for operating a display device, when changing an operating frequency, according to an embodiment of the disclosure.

Referring to FIGS. 2, 4A, 6, and 8, a display driving circuit 210 may reduce (or prevent) a flicker phenomenon of a display panel 250 through a method for correcting a duty ratio as illustrated in FIG. 4A, 5, or 6.

Referring to FIG. 8, in operation 810, the display driving circuit 210 may supply the light emitting control signal PCS to the light emitting control driver 240 at the first operating frequency (e.g., 60 Hz). In operation 820, the display driving circuit 210 may set the operating frequency change target (or refresh rate). For example, the display driving circuit 210 may receive a signal related to the change of the operating frequency, from the processor 120.

According to an embodiment, in operation 830, the display driving circuit 210 may determine whether the duty-ratio difference is less than a reference value (e.g., 5% and the second reference value of FIG. 4A) at the target time point to change the operating frequency. For example, the duty-ratio difference may refer to the difference between the duty ratio of adjacent pulses (e.g., a high-level pulse and a low-level pulse) of the light emitting control signal PCS, and the specific duty ratio (e.g., 50%). For example, as illustrated in FIGS. 4A, 4B, 5, and 6, the display driving circuit 210 may calculate a duty-ratio difference between the frame FA and the frame FB. When the duty-ratio difference is less than the reference value, the display driving circuit 210 may provide the light emitting control signal PCS to the light emitting control driver 240 at the second operating frequency (e.g., 55 Hz) at the target time point to change the operating frequency, instead of performing the method as in FIGS. 4A, 4B, 5, and 6, in operation 850. When the duty-ratio difference is greater than or equal to the reference value, operation 840 may be performed.

According to another embodiment, in operation 840, the display driving circuit 210 may correct a duty ratio for at least one pulse of the light emitting control signal PCS after the target time point to change the operating frequency. Alternatively, the display driving circuit 210 may insert a bridge frame BF at the time point to change the operating frequency and may correct the duty ratio for the at least one of the light emitting control signal PCS included in the bridge frame BF. The display driving circuit 210 may set (or adjust) the length (or time) of pulses, which are included in the light emitting control signal PCS, in the frame (e.g., the frame (FB)) right after the target time point to change the operating frequency, through the method for correcting the duty ratio as illustrated in FIG. 4A. For example, the display driving circuit 210 may insert the bridge frame BF at the time point to change the operating frequency and may set (or adjust) the lengths (or times) of pulses included in the light emitting control signal PCS in the bridge frame BF through the method as illustrated in FIGS. 5 and 6. The display driving circuit 210 may correct the duty ratio in a frame right after the time point to change the operating frequency through the method as illustrated in FIG. 4A, 5, or 6, and may perform the operation 830 again. Accordingly, the display driving circuit 210 may repeatedly perform the method as in FIG. 4A, 5, or 6, until the flicker phenomenon does not occur. Alternatively, the display driving circuit 210 may correct the duty ratio in a plurality of frames through the method as illustrated in FIG. 4A or may insert a plurality of bridge frames through the method as illustrated in FIG. 5 or 6.

According to yet another embodiment, in operation 850, the display drive circuit 210 may provide the light emitting control signal PCS to the light emitting control driver 240 at the second operating frequency (e.g., the second operating frequency of FIG. 4A, or the third operating frequency of FIGS. 5 and 6) from the time point to change the operating frequency, a frame next to a frame, in which the duty ratio is changed through the method as illustrated in FIG. 4A, or a frame next to the bridge frame. In operation 860, the display driving circuit 210 may complete an operation of changing the operating frequency and may control the display panel 250 based on the changed operating frequency (e.g., the second operating frequency).

Figure 9:
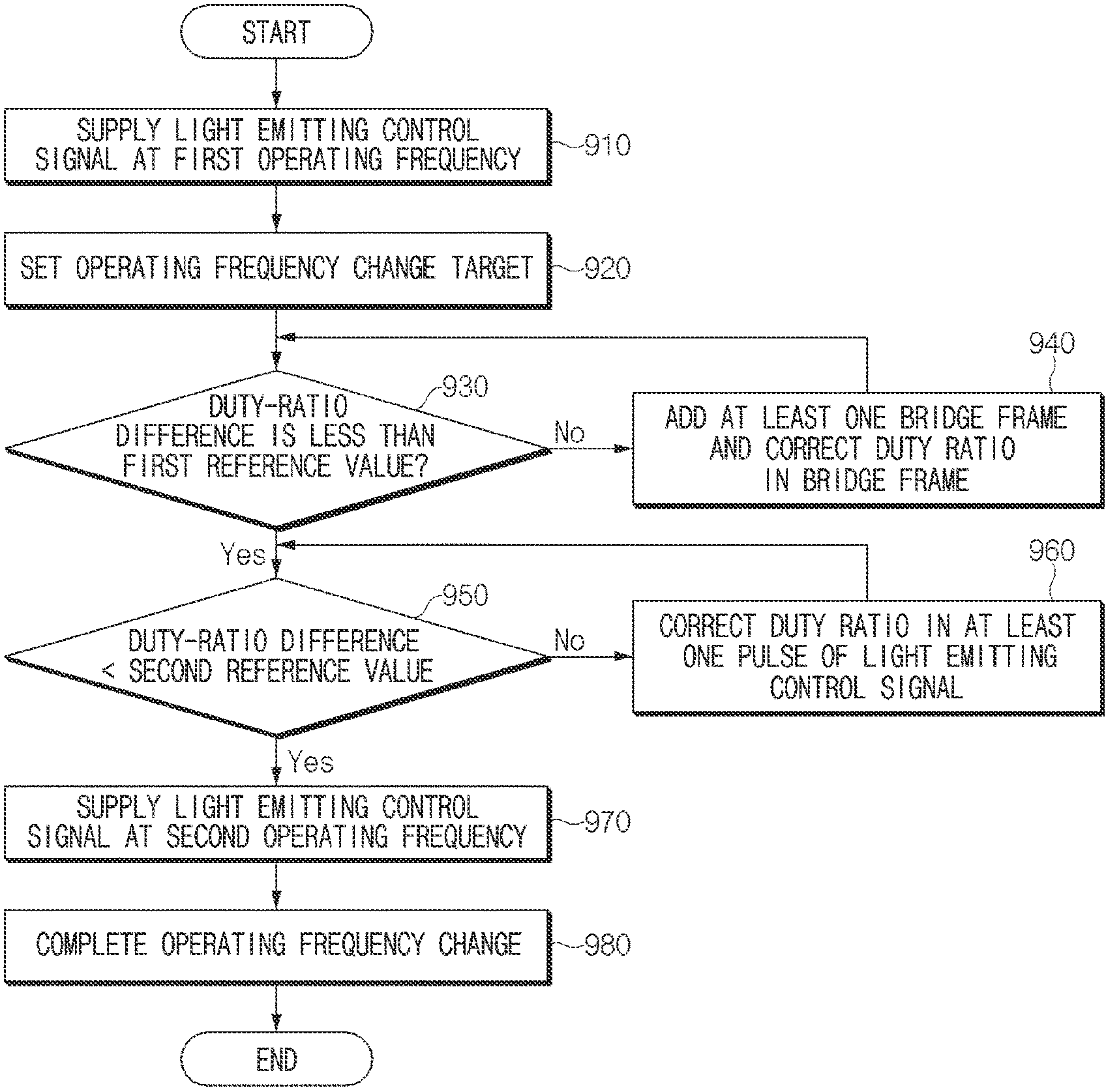
FIG. 9 is a flowchart illustrating a method for operating a display device, when changing an operating frequency, according to an embodiment of the disclosure.

FIG. 9 is a flowchart illustrating a method for operating a display device, when changing an operating frequency, according to an embodiment of the disclosure.

Referring to FIGS. 2, 4A, 6, and 9, a display driving circuit 210 may reduce (or prevent) a flicker phenomenon of a display panel 250 through a method for correcting a duty ratio as illustrated in FIG. 4A, 5, or 6.

Referring to FIG. 9, in operation 910, the display driving circuit 210 may provide the light emitting control signal PCS to the light emitting control driver 240 at the first operating frequency (e.g., 60 Hz). In operation 920, the display driving circuit 210 may set the operating frequency change target (or refresh rate). The display driving circuit 210 may receive a signal related to the change of the operating frequency, from the processor 120.

According to an embodiment, in operation 930, the display driving circuit 210 may determine whether the duty-ratio difference is less than a first reference value (e.g., 10% and the first reference value of FIGS. 4A, 4B, 5, and 6) at the target time point to change the operating frequency. For example, the duty-ratio difference may refer to the difference between the duty ratio of adjacent pulses (e.g., a high-level pulse and a low-level pulse) of the light emitting control signal PCS, and the specific duty ratio (e.g., 50%). For another example, as illustrated in FIGS. 4A, 4B, 5, and 6, the display driving circuit 210 may calculate a duty-ratio difference between the frame FA and the frame FB. When the duty-ratio difference is less than the first reference value, operation 950 may be performed. When the duty-ratio difference is greater than or equal to the first reference value, operation 940 may be performed.

According to another embodiment, when the duty-ratio difference is equal to or greater than the first reference value, the display driving circuit 210 may insert a bridge frame BF at the time point to change the operating frequency and may correct the duty ratio for the at least one of the light emitting control signal PCS included in the bridge frame BF, in operation 940. For example, when the duty-ratio difference is equal to or greater than the first reference value, the duty-ratio difference has a greater value. Accordingly, it is difficult to prevent the flicker phenomenon through the method as in illustrated FIG. 4A. The display driving circuit 210 may insert the bridge frame BF at the time point to change the operating frequency and may set (or adjust) the lengths (or times) of pulses included in the light emitting control signal PCS in the bridge frame BF through the method as illustrated in FIG. 5 or 6. The display driving circuit 210 may correct the duty ratio in a frame right after the time point to change the operating frequency through the method as illustrated in FIG. 5 or 6, and may perform the operation 930 again. The display driving circuit 210 may repeatedly perform the method as illustrated in FIG. 5 or 6, until the duty-ratio difference becomes less than the first reference value. Alternatively, the display driving circuit 210 may insert a plurality of bridge frames through the method as illustrated in FIG. 5 or 6.

According to still another embodiment, in operation 950, the display driving circuit 210 may determine whether the duty-ratio difference is less than a second reference value (e.g., 5% and the second reference value of FIG. 4A) at the target time point to change the operating frequency. When the duty-ratio difference is less than the second reference value, operation 970 may be performed. The display driving circuit 210 may provide the light emitting control signal PCS to the light emitting control driver 240, at the second operating frequency at the time point to change the operating frequency or a time point next to that of the bridge frame, in operation 970, instead of performing the method as illustrated in FIG. 4A. When the duty-ratio difference is greater than or equal to the second reference value, operation 960 may be performed.

According to an embodiment, when the duty-ratio difference is less than the first reference value and greater than or equal to the second reference value, the display driving circuit 210 may correct the duty ratio in at least one pulse of the light emitting control signal PCS at the time point to change the operating frequency or after the bridge frame, in operation 960. For example, when the duty-ratio difference is less than the first reference value and greater than or equal to the second reference value, the duty-ratio difference has a less value. Accordingly, it is difficult to prevent the flicker phenomenon through the method as in illustrated FIG. 4A. The display driving circuit 210 may set (or adjust) the length (or time) of pulses, which is included in the light emitting control signal PCS, in the frame (e.g., the frame (FB)) right after the target time point to change the operating frequency and the bridge frame, through the method for correcting the duty ratio as illustrated in FIG. 4A. The display driving circuit 210 may correct the duty ratio through the method as illustrated in FIG. 4A and may perform operation 950 again. The display driving circuit 210 may repeatedly perform the method as in FIG. 4A, until the flicker phenomenon does not occur. Alternatively, the display driving circuit 210 may perform correct duty ratio in a plurality of frames through the method as illustrated in FIG. 4A.

According to another embodiment, in operation 970, the display drive circuit 210 may supply the light emitting control signal PCS to the light emitting control driver 240 at the second operating frequency from the time point to change the operating frequency, a frame next to a frame, in which the duty ratio is changed through the method as illustrated in FIG. 4A, or a frame next to the bridge frame. In operation 980, the display driving circuit 210 may complete an operation of changing the operating frequency and may control the display panel 250 based on the changed operating frequency (e.g., the second operating frequency).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software or machine readable instructions (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display device comprising:

a display panel; and a display driving circuit configured to control the display panel and including a light emitting control driver to input a light emitting signal for controlling a brightness of the display panel into the display panel, wherein the display driving circuit is further configured to:

input a light emitting control signal including a plurality of pulses to the light emitting control driver, to control the light emitting signal, change an operating frequency of the light emitting control signal at a target time point from a first frequency in a first frame prior to the target time point to a second frequency in a second frame after the target time point, and adjust pulse widths, which correspond to at least two pulses of the plurality of pulses included in the light emitting control signal, to differ from each other, in the second frame subsequent to the first frame, when a duty-ratio difference between a specific duty ratio and a target duty ratio is equal to or greater than a reference value, and wherein the target duty ratio is calculated based on a last low level pulse among the plurality of pulses in the first frame and a first high level pulse right after the last low level pulse among the plurality of pulses in the second frame.

2. The display device of claim 1, wherein the display driving circuit is further configured to:

arrange the at least two pulses, which has the adjusted pulse widths, such that the at least two pulses are not adjacent to each other.

3. The display device of claim 1, wherein the display driving circuit is further configured to:

sequentially increase or decrease pulse widths corresponding to pulses included in the second frame after the target time point to change the operating frequency.

4. The display device of claim 1, wherein the display driving circuit is further configured to:

adjust a pulse width of the first high level pulse right after the target time point, such that the duty-ratio difference is less than the reference value.

5. A display device comprising:

a display panel; and a display driving circuit configured to control the display panel and including a light emitting control driver to input a light emitting signal for controlling a brightness of the display panel into the display panel, wherein the display driving circuit is configured to:

input a light emitting control signal including a plurality of pulses to the light emitting control driver, to control the light emitting signal, change an operating frequency from a first frequency in a first frame to a second frequency in a second frame after the first frame, and adjust pulse widths, which correspond to at least two pulses of pulses included in the light emitting control signal in the second frame subsequent to the first frame, to differ from each other, or insert a third frame between a first frame and the second frame, which are subsequent to each other, and adjust the pulse widths, which correspond to at least two pulses of pulses included in the light emitting control signal in the third frame, to differ from each other, when a duty-ratio difference between a specific duty ratio and a target duty ratio is equal to or greater than a reference value, and wherein the target duty ratio is calculated based on one low level pulse applied last among the plurality of pulses in the first frame and one high level pulse applied first among the plurality of pulses in the second frame.

6. The display device of claim 5, wherein the display driving circuit is further configured to:

generate the light emitting control signal to have a third operating frequency between a first operating frequency of the first frame and a second operating frequency of the second frame, in the third frame, and adjust pulse widths corresponding to at least two pulses of pulses included in the third frame, such that the duty-ratio difference is less than the reference value.

7. The display device of claim 6, wherein the display driving circuit is further configured to:

arrange the at least two pulses, which has the adjusted pulse widths, such that the at least two pulses are not adjacent to each other, in the third frame.

8. The display device of claim 5, wherein the display driving circuit is further configured to:

sequentially increase or decrease pulse widths corresponding to the pulses included in the third frame.

9. The display device of claim 8, wherein the pulse widths corresponding to the pulses included in the third frame are set to values between a pulse width corresponding to a pulse included in the first frame and a pulse width corresponding to a pulse included in the second frame.

10. The display device of claim 5, wherein the display driving circuit is further configured to:

generate the light emitting control signal to have a pulse cycle different from a pulse cycle in the first frame or a pulse cycle in the second frame, in the third frame.

11. The display device of claim 5, wherein the display driving circuit is further configured to:

generate the light emitting control signal to have a pulse cycle greater than a pulse cycle in the first frame or a pulse cycle in the second frame, in the third frame.

12. A display device comprising:

a display panel; and a display driving circuit configured to control the display panel and including a light emitting control driver to input a light emitting signal for controlling a brightness of the display panel into the display panel, wherein the display driving circuit is configured to:

input a light emitting control signal including a plurality of pulses to the light emitting control driver, to control the light emitting signal, change an operating frequency from a first frequency in a first frame to a second frequency in a second frame after the first frame, insert a bridge frame between the first frame and the second frame, which are subsequent to each other, and adjust pulse widths, which correspond to at least two pulses of pulses included in the light emitting control signal in the bridge frame, to differ from each other, when a duty-ratio difference between a specific duty ratio and a target duty ratio is equal to or greater than a first reference value, and wherein the target duty ratio is calculated based on a low level pulse applied last among the plurality of pulses in the first frame and a high level pulse applied first among the plurality of pulses in the second frame.

13. The display device of claim 12, wherein the display driving circuit is further configured to:

adjust pulse widths, which correspond to at least two pulses of pulses included in the second frame, to differ from each other, when the duty-ratio difference is less than the first reference value and greater than or equal to a second reference value.

14. The display device of claim 13, wherein the display driving circuit is further configured to:

adjust the pulse widths corresponding to the at least two pulses of the pulses included in the second frame, such that the duty-ratio difference is less than the second reference value.

15. The display device of claim 14, wherein the display driving circuit is further configured to:

arrange the at least two pulses, which has the adjusted pulse widths, in the second frame, such that the at least two pulses are not adjacent to each other.

16. The display device of claim 13, wherein the display driving circuit is further configured to:

sequentially increase or decrease pulse widths corresponding to the pulses included in the second frame.

17. The display device of claim 12, wherein the display driving circuit is further configured to:

generate, in the bridge frame, the light emitting control signal to have a third operating frequency between a first operating frequency of the first frame and a second operating frequency of the second frame, and adjust the pulse widths corresponding to the at least two pulses of the pulses included in the bridge frame, such that the duty-ratio difference is less than the first reference value.

18. The display device of claim 12, wherein the display driving circuit is further configured to:

sequentially increase or decrease pulse widths corresponding to the pulses included in the bridge frame.

19. The display device of claim 18, wherein the pulse widths corresponding to the pulses included in the bridge frame are set to values between a pulse width corresponding to a pulse included in the first frame and a pulse width corresponding to a pulse included in the second frame.

20. The display device of claim 12, wherein the display driving circuit is further configured to:

generate the light emitting control signal to have a cycle different from a cycle in the first frame or a cycle in the second frame, in the bridge frame.

* * * * *